United States Patent [19]

Rudish et al.

[11] Patent Number: 4,652,879
[45] Date of Patent: Mar. 24, 1987

[54] PHASED ARRAY ANTENNA SYSTEM TO PRODUCE WIDE-OPEN COVERAGE OF A WIDE ANGULAR SECTOR WITH HIGH DIRECTIVE GAIN AND STRONG CAPABILITY TO RESOLVE MULTIPLE SIGNALS

[75] Inventors: Ronald M. Rudish, Commack; Scott F. Hall, Plainview, both of N.Y.

[73] Assignee: Eaton Corporation, Cleveland, Ohio

[21] Appl. No.: 700,115

[22] Filed: Feb. 11, 1985

[51] Int. Cl.⁴ .......................... H01Q 3/22; H01Q 3/26
[52] U.S. Cl. ...................................... 342/371; 342/373
[58] Field of Search ................................ 343/371-375

[56] References Cited

U.S. PATENT DOCUMENTS 3,631,503 12/1971 Tang et al. .......................... 343/371
4,277,787 7/1981 King .................................... 343/371

Primary Examiner—Theodore M. Blum
Assistant Examiner—Gregory C. Issing
Attorney, Agent, or Firm—Oldham, Oldham & Weber Co.

[57] ABSTRACT

A phased array antenna system capable of scanning at rates faster than the information rate of signals being received to prevent the loss of information during the scanning process. The phased array is configured to add the capability to provide multi-dimensional separation of multiple signals to enable measurement of direction of arrival and frequency, and to eliminate the sensitivity loss due to sampling usually encountered with such rapid-scan systems. The array antenna system is comprised of the means to form multiple, time-sequenced responses, each response corresponding to a different beam of sensitivity. The beams scan the full coverage sector and together with each other form a contiguous set of beams that both fill the coverage sector at any one time and also synchronously scan the full coverage sector. The beams are differentially delayed to permit the beam responses from any particular incident signal to be added in unison, giving rise to a compressed pulse whose time of occurrence is related to the signal angle of incidence. The means for beam addition selectively forms a coherent sum at only one of its multiplicity of output ports, the particular port being a periodic function of the signal frequency. The ambiguities which arise in frequency resolution and frequency measurement capability due to this periodicity are resolved by coarse frequency channelizers. This arrangement retains the wide-open angular reception characteristics of a wide-beam or omnidirectional antenna, while exhibiting the gain and angular resolution of a multi-beam phased array antenna, and the frequency resolution of a channelized receiver.

4 Claims, 9 Drawing Figures

4,652,879

PHASED ARRAY ANTENNA SYSTEM TO PRODUCE WIDE-OPEN COVERAGE OF A WIDE ANGULAR SECTOR WITH HIGH DIRECTIVE GAIN AND STRONG CAPABILITY TO RESOLVE MULTIPLE SIGNALS

TECHNICAL FIELD

This invention relates to electronically scanned receiving antenna systems which scan at rates faster than the information rate of the signals being processed and, more particularly, to improvements in the signal combining subsystem of such systems to simultaneously achieve high values of directive gain and separation of multiple signals based on frequency, time-of-arrival and direction-of-arrival.

In the future, it is expected that the increased deployment of radars, in general, and of high PRF pulse doppler radars, in particular, will lead to a microwave signal environment which is dense in the time domain as well as in the frequency and spatial domains. The signal environment might be further complicated if there is increased use of emitters which pseudo-randomly frequency hop and/or pseudo-randomly stagger PRF's. This will make it increasingly desirable to sort emissions by direction-of-arrival (DOA), preferably on an individual pulse basis to maintain 100 percent probability of intercept. It will also be desirable to be able to separate individual pulse signals in at least two or three dimensions, such as DOA, frequency and time, simultaneously. This would make it possible to make unambiguous measurements of the frequencies of multiple signals which overlap in time and are within the same DOA resolution cell. It would likewise enable more accurate estimates of DOA for multiple signals which overlap in time and are within the same frequency resolution cell.

There will also be applications (ELINT, for example) in which the crowded signal environment is less likely to be a problem than the trend toward less detectable emissions (more highly suppressed sidelobes, spread spectrum coding, etc.). In these applications, it would be desirable to obtain increased sensitivity via antenna directivity, but without giving up 100 percent probability of detection.

Conceptually, existing technology provides a prior art means by which multi-dimensional signal separation and directional gain could be accomplished while maintaining 100 percent probability of intercept. A multiple beam antenna, such as a linear array and Butler matrix combination, could be connected to multiple sophisticated receivers, one for each output (beamport) of the Butler matrix. The receivers would have to be of the channelized or of the compressive type if frequency resolution and 100 percent probability of intercept are to be obtained.

One such prior art system is illustrated in FIG. 1 which contains a block diagram of an antenna and receiver combination. The component elements shown in FIG. 1 comprise a linear array of N antenna elements 101, N equal length transmission lines 103 which connect the antenna elements 101 to the N inputs 107 of an N by N Butler matrix 102, N transmission lines 104 which connect the N outputs 108 of Butler matrix 102 to N channelized receivers 105, each receiver having K outputs 106, one for each frequency channel.

For a meaningful degree of DOA separation in situations where there are many time overlaps, at least eight (and perhaps as many as sixteen) beams and receiver/encoders would be required. Each receiver would have at least K narrow-band frequency filters if each receiver is channelized into K contiguous frequency bands with all bands simultaneously available for signal reception and without use of sub-band summing (so that maximum available sensitivity is achieved). Thus, an N beam system would require K☆N filters. For example, a system having 16 beams and covering 500 MHz bandwidth with 50 channels, each 10 MHz wide, would require 800 filters. Usually, this large amount of sophisticated hardware is impractical to implement. Furthermore, practical considerations such as filter size (considering the large number required) limit the filter Q obtainable in practice and this in turn limits the operating frequency of the filters to only a few hundred times their bandwidth. That in turn limits the overall frequency bandwidth that can be simultaneously covered by a single system. For example, to achieve filter bandwidths as narrow as 10 MHz; the operating frequency of the filters cannot be much greater than several hundred MHz, so that the overall simultaneous frequency coverage bandwidth also must be limited to several hundred MHz.

It is the purpose of the present invention to overcome these practical limitations of such prior art solutions by presenting a hardware efficient method of obtaining high-gain multidimensional signal separation, while maintaining 100 percent probability of intercept.

DISCLOSURE OF INVENTION

It is therefore an object of the present invention to provide an array antenna system capable of scanning through its complete coverage sector within the time period of the shortest pulse expected to be received, thereby maintaining the same high probability of intercepting such a signal as can be achieved with a single wide-beamwidth element of the array.

It is another object of the present invention to achieve the gain available from an N element array by recovering the signal loss which occurs in the arrays of other systems due to sampling the signal during only a portion of its time of presence.

Another object of the invention is to provide multidimensional resolution of multiple incident signals, sorting them by their time-of-arrival, direction-of-arrival and frequency.

It is yet another object of the present invention to provide the ability to determine the frequencies of multiple incident signals and the ability to determine their direction-of-arrival commensurate with the narrow beamwidth achievable with a full N element array.

Another object of the present invention is to gain the advantages of the above objects using fewer components than are required for multiple beam antenna systems that require separate complete receivers for each beam.

Another object of the present invention is to enable wide frequency bandwidth operation by providing the ability to simultaneously cover N times the frequency bandwidth than can be covered by prior art multiple beam antenna systems with separate channelized receivers for each beam, such as the prior art system of FIG. 1.

In general, an apparatus for adding the capability to separate multiple signals and for eliminating the sampling loss of signal energy in systems having a coverage sector through which the antenna system scans multiple beams at a rate that is faster than the information rate being received, comprises: (a) a linear phased array antenna comprising a row formed of a plurality of antenna elements, one of said antenna elements at one end of the row being designated the first element, while the remaining elements are designated by succeeding numbers in arithmetic progression across the row of antenna elements, and the antenna elements being considered as being positioned in the azimuth plane for reference purposes; (b) means for forming a plurality of beams of sensitivity coupled to said antenna elements, said plurality of beams of sensitivity being equal in number to the number of antenna elements in said row, the beams being contiguous and considered as lying in the azimuth plane for reference purposes, with each beam being generally evenly spaced from the adjacent beams in sin $\theta$ space, where $\theta$ is the angle away from broadside in the azimuthal plane, the spacing between beam center directions in sin $\theta$ space being generally proportional to the reciprocal of the number of antenna elements, and the beams, taken together to form a larger composite beam, span the entire azimuth coverage sector; (c) means coupled to said antenna elements for synchronously scanning each of the beams over the entire coverage sector, the beams maintaining their relative positions adjacent one another in sin $\theta$ space during scanning, the scanning being carried out periodically at a rate that is at least twice as fast as the highest information rate being received; (d) means coupled to said antenna elements for accepting signals received by each beam and differentially delaying said signals to cause their modulation envelopes to respond in unison to a single emitting source at a particular azimuth angle within the sector coverage of the antenna system; (e) means for coherently combining said signals after said signals have been differentially delayed, said means for combining being arranged to cause coherent addition selectively at different output ports of said combiner for different signal frequencies; and (f) means for separating multiple signals at a single output port of said combiner when said signals have frequencies corresponding to grating lobe response.

BEST MODE FOR CARRYING OUT THE INVENTION

The present invention overcomes the practical limitations of prior art multiple beam antenna systems that require separate receivers and provides all of the advantages of the aforementioned objectives simultaneously with a single configuration.

The antenna/receiver system of the present invention creates a set of contiguous beams of sensitivity which are scanned through a designated coverage sector within the time period of the shortest emitter pulse. Such rapid scan is obtained by heterodyne techniques; it results in a predictably compressed pulse (as in the case of a compressive receiver) whose time of occurrence is directly related to the emitter azimuth location.

The present invention avoids sampling loss by using different beams to sample the incident signal continuously during its entire time of presence. As a result, the present invention can yield a sensitivity improvement of N times (where N is the number of array elements) relative to that of the prior implementations which involved the scanning of a single beam. In these prior implementations an incident pulse is sampled by the system for only a fraction of its width as the single beam sweeps by its incidence direction; this limits system sensitivity since only a fraction of the available pulse energy is delivered to the antenna/receiver output.

The manner of beam combination utilized in the present invention results naturally in a narrow bandwidth channelization of signals in accordance with their frequency, in effect, doing the finegrain filtering required in a high-resolution channelized receiver without requiring the use of narrow-band filters.

Figure 2:
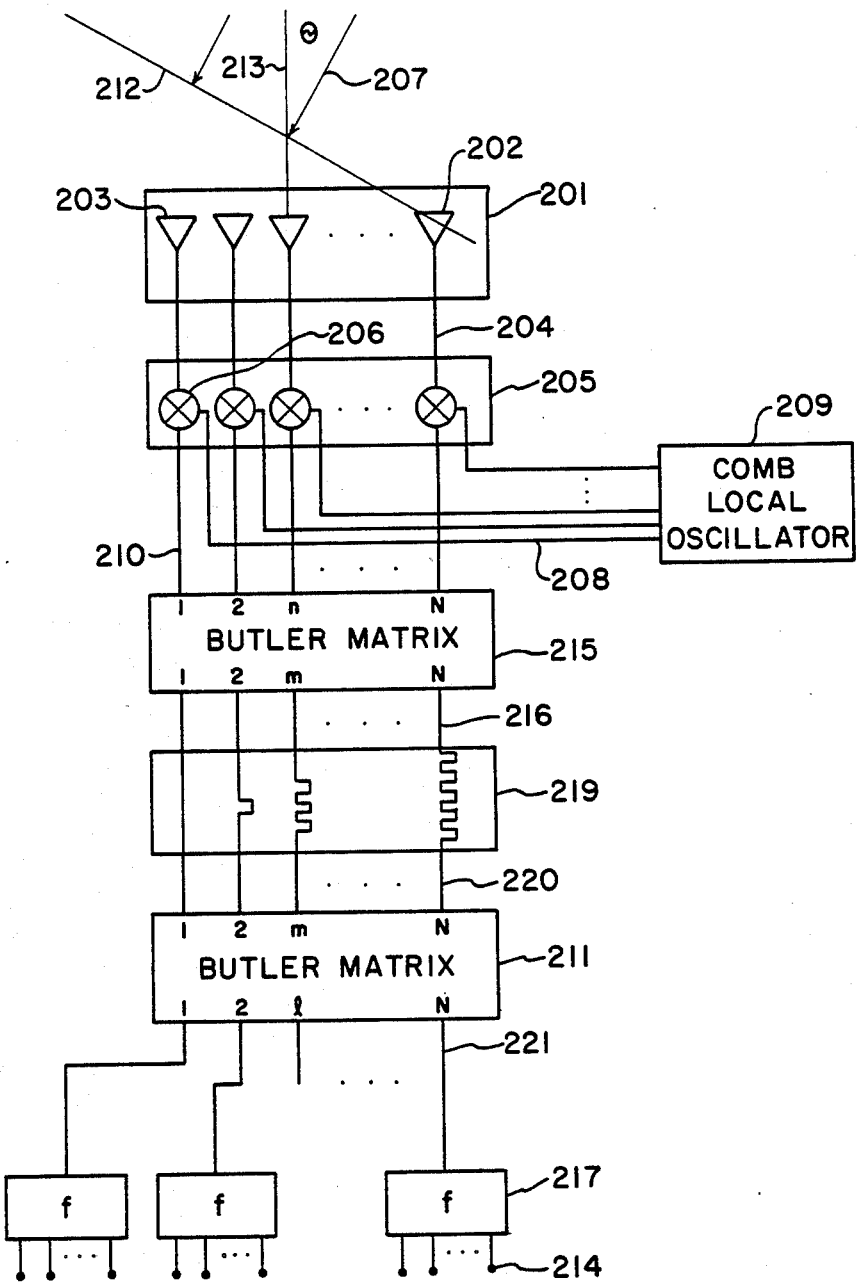
FIG. 2 is a block diagram of a phased array antenna and receiver front-end, illustrating the present invention.

To clearly illustrate various novel aspects of the current invention, a specific example is taken in which an N element linear array incorporating the invention is exposed to a signal wavefront incident from a direction $\theta$ with respect to the array normal. This embodiment of the invention and the incident wavefront are shown in FIG. 2 which contains a block diagram of an antenna and receiver front end. The component elements shown in FIG. 2 comprise a linear array of N antenna elements 201, an end antenna element 202 and a nth element 203, N equal-length transmission lines 204 which connect elements 201 to N heterodyne mixers 205, an nth mixer 206, N equal length transmission lines 208 which connect mixers 205 to a comb local oscillator 209, N equal length transmission lines 210 which connect the mixers 205 to first Butler matrix 215, N equal length transmission lines 216 which connect first Butler matrix 215 to a set of N delay lines 219 of progressively differing length, N equal length transmission lines 220 which connect the delay lines 219 to a second Butler matrix 211, and N equal length transmission lines 221 which connect the second Butler matrix 211 with N coarse channelization filters 217, each channelization filter having K output ports 214. Amplifiers could be inserted before and after the mixers in a practical implementation, but they have been omitted from FIG. 2 because their presence is not required for the purpose of explaining the approach.

A detailed description of how the components of FIG. 2 function to obtain high directive gain with angular and frequency resolution follows for the case where a single CW signal is incident.

As shown in FIG. 2, an obliquely incident wavefront 212 induces RF signals, in the antenna elements 201, the signal induced in the nth element 203 being expressed as $e_n$. These signals are progressively delayed by an amount $\phi_S$, where $\phi_S$ is the phase difference between the signals received by adjacent elements. Numerically, $$\phi_S = \frac{(2\pi d)}{\lambda_S} \sin \theta,$$

where $\lambda_S$ is the wavelength of the incident signal, d is the interelement spacing and $\theta$ is the angle between the direction of incidence 207 and the array normal 213. Therefore $e_n$ is given by:

$$e_n = \cos[\omega_S t + (n - \bar{n})\phi_S] \quad (1)$$

where $\omega_S$ = the radian frequency of the incident signal; $\bar{n} = (N+1)/2$; and N = the total number of elements.

These signals are applied to the mixers 205. Also applied to the mixers are a set of coherently related local oscillator (LO) signals. These are generated by the comb local oscillator 209. Each LO signal differs in frequency by integer multiples of a constant frequency offset, $w_l$. The LO signals are coherent in the sense that once every cycle of the offset frequency, all of the LO signals reach the peak of their positive half cycles simultaneously. Numerically, the nth LO frequency is given by:

$$\omega_{LO} = \bar{\omega}_{LO} + (n - \bar{n})\omega_1$$

where $\bar{\omega}_{LO}$ is the average LO frequency. Because of the progressive frequency difference, the LO signals exhibit a time-varying phase advance, $\phi_{LO} = (n - \bar{n})\omega_1 t$.

The IF signals produced by the mixers are progressively phased in accordance with the difference of RF and LO progressive phasing, as may be noted from the expression for the IF signal, $$e_{IF} = \cos[\bar{\omega}_{IF} t - (n - \bar{n})(\omega_1 t - \phi_S)]$$

and $$\bar{\omega}_{IF} = \omega_S - \bar{\omega}_{LO}$$

Thus, the inputs to the first Butler matrix 215 are a set of equal amplitude IF signals having a phase progression that is linear with n and with time. In a practical system, amplitude tapering (weighting) might be applied to the signals prior to their entrance into the Butler matrix, for radiation pattern sidelobe control. However, this detail has been omitted from FIG. 2 because it is not required in order to explain the approach.

The Butler matrix divides the signal at its nth input in N equal parts, phase shifts each by an amount, $\phi_B$ and combines each with signals which originated from other ports to form the sum, $e_m$, at its mth output. The phase shift, $\phi_B$, is dependent on both m and n and is given by:

$$\phi_B = (n - \bar{n})(m - \bar{n})\frac{2\pi}{N}, \quad (\phi_B \text{ is modulo } 2\pi)$$

Thus, the output voltage, $e_m$, is the summation:

$$e_m = \frac{1}{\sqrt{N}} \sum_{n=1}^{n=N} \cos\left[\bar{\omega}_{IF} t - (n - \bar{n})(\omega_1 t - \phi_S) + (n - \bar{n})(m - \bar{n})\frac{2\pi}{N}\right]$$

where $\sqrt{N}$ factor accounts for the N-way power division. It can be shown that the summation equates to the form:

$$e_m = \frac{E_m}{\sqrt{N}} \cos(\omega_{IF} t) \quad (2)$$

where:

$$E_m = \frac{\sin(\frac{1}{2}NX_m)}{\sin(\frac{1}{2}X_m)}, \quad X_m = \phi_S - \omega_1 t + (m - \bar{n})\frac{2\pi}{N}$$

Figure 1:
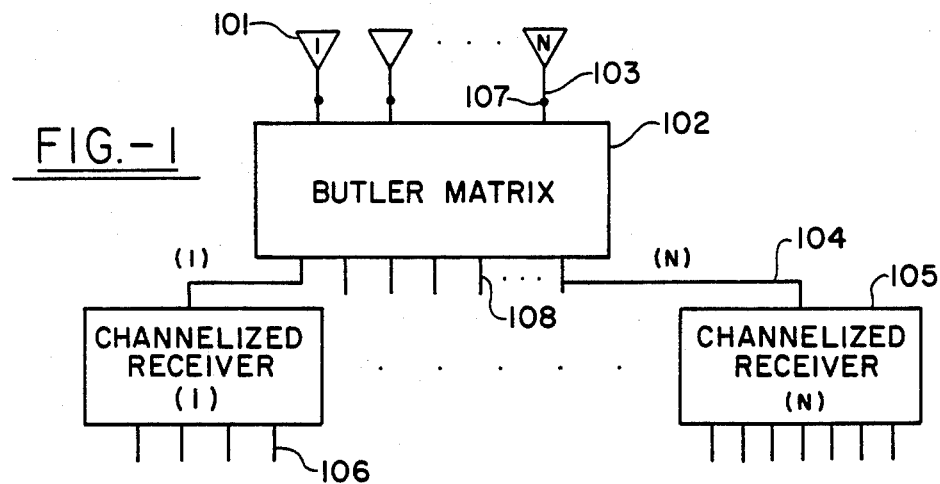
FIG. 1 is a block diagram of a prior art multiple beam array antenna and multiple channelized receivers which provides multidimensional resolution of signals and high directional gain.
Figure 3:
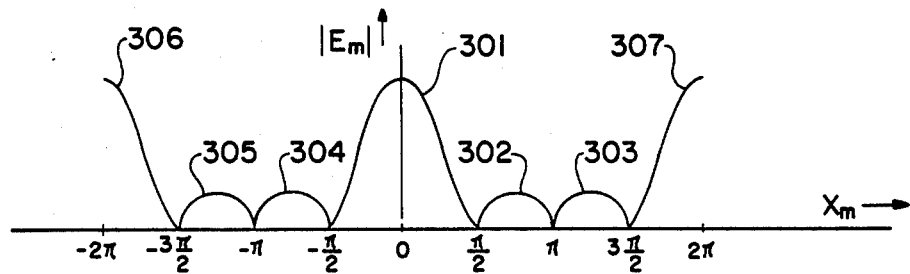
FIG. 3 is a graph of the envelope magnitude $|E_m|$ of an output voltage of the first Butler matrix in the present invention, plotted against the composite variable $X_m$ for $N=4$.
Figure 4:
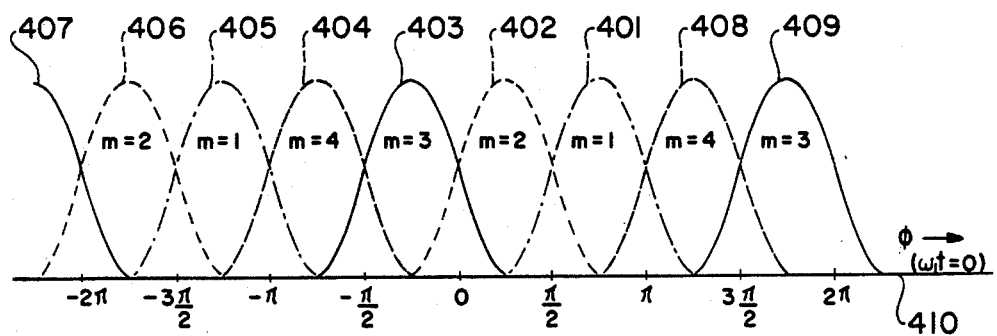
FIG. 4 is a graph of the envelope magnitude $|E_m|$ for an output voltage of the first Butler matrix in the present invention, plotted against the constituent variable $\phi$ for $N=4$.

It may be noted from these expressions that each Butler matrix output, $e_m$ is the product of an envelope term, $E_m$, and a carrier term. The envelope magnitude $|E_m|$ is plotted for N=4 in FIG. 3 as a function of $X_m$. The curve is a periodic function of $X_m$, having a main-lobe 301, sidelobes 302, 303, 304 and 305 and grating lobes 306 and 307 within the range plotted. The envelope term $|E_m|$ is again plotted in FIG. 4; in this case it is as a function of which is one of $\phi_S$ which is one of the constituents of $X_m$, and it is assumed that $\omega_1 t$, another constituent, is held at zero. Since $\phi_S$ is a function of $\theta$, FIG. 4 shows the directional dependence $|E_m|$. Four curves are plotted using different line codes, one for each of the four Butler matrix outputs. Only the main-lobes 401, 402, 403 and 404 and grating lobes 405, 406, 407, 408 and 409 are shown; the sidelobes have been suppressed for purposes of clarity. Taken together, the four curves form a continuous set which provides outputs for all values of $\phi_S$ (and thus all values of $\theta$). These outputs correspond to a set of contiguous beams of sensitivity which together span the entire coverage sector.

Figure 5:
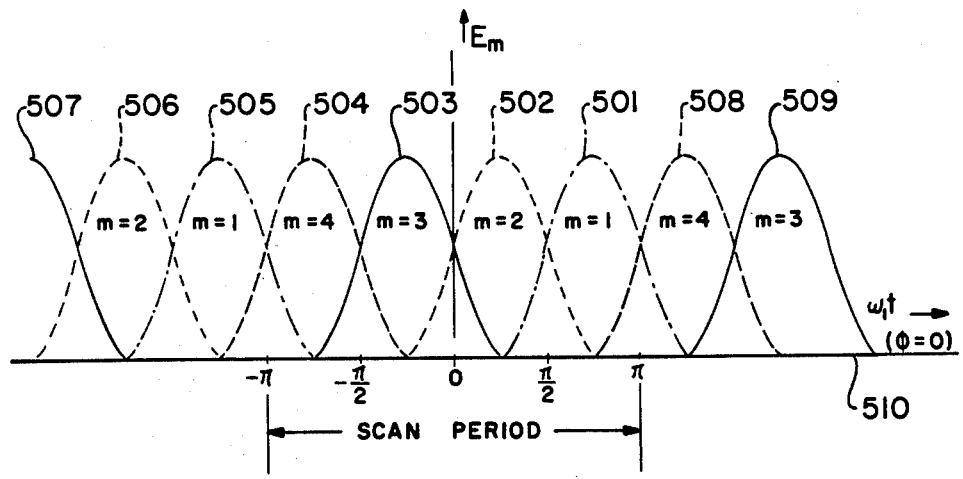
FIG. 5 is a graph of the envelope magnitude $|E_m|$ for each of the output voltages of the first Butler matrix in the present invention, plotted against the constituent variable $-\omega_1 t$ for $N=4$.

The envelope term $|E_m|$ is once again plotted in FIG. 5; in this case it is plotted as a function of $-\omega_1 t$ (the second constituent of $X_m$) and $\phi_S$ (the first constituent) is held constant at zero. Except for the relabeling of the abscissa (the $\phi_S$ axis 410 becomes the $-\omega_1 t$ axis 510) the curves of FIG. 5 are identical with those of FIG. 4, which is not surprising since a given value of $X_m$ can result from either a specific value of direction or a specific value of time. FIG. 5 shows that the lobes of the output envelope $|E_m|$ at each Butler port peaks at specific times which are staggered relative to the peaks at other ports. These lobes are, in effect, the responses of an N beam, N element array antenna whose beams are being scanned past the direction of an emitter in sequence, smoothly with time.

Each of the beams is only on target for 1/N of the scan period. Thus, each beam samples only 1/Nth the signal energy available at the radiators. However, all the beams, taken together, sample all the signal energy. To get all the energy at a single output requires that the multiple time-sequenced outputs of the Butler matrix be coherently summed. That in turn requires that both the carriers and envelopes of these outputs be brought into phase unison.

In the system shown in FIG. 2, the delay lines 219 are configured to progressively delay the envelopes by the amount $T_m$, where:

$$T_m = \left(\frac{m - \bar{n}}{\omega_1}\right)\left(\frac{2\pi}{N}\right) + \text{an arbitrary constant} \quad (3)$$

The delay operation causes all the envelopes to peak at the same time. However, this delay operation causes the phase of each carrier to be displaced by several cycles from that of the other carriers, the exact amount of displacement being a linear function of $\bar{\omega}_{IF}$. Periodically, over the $\bar{\omega}_{IF}$ frequency band, the carrier phases will be an integral multiple of $2\pi$ radians apart and thus, effectively cophasal. For signals which produce these values of $\bar{\omega}_{IF}$, the outputs of the delay lines may be coherently summed to obtain all the available signal energy. For other frequencies, the carriers will be in various states of partial or complete destructive interference and so if summed would combine to values less than the peak value. To coherently sum the delay line outputs for these other frequencies would require the addition of progressively increasing phase offsets to each of the signals prior to summing. Just such a task is performed by the second Butler matrix 211 of the system shown in FIG. 2. This Butler matrix is identical to the first one 215; indeed, Butler matrix 211 divides the signal at its mth input into N equal parts, phase shifts each by an amount $\phi_B^l$ (where $\phi_B^l = (l-n)(m-\bar{n})(2\pi/N)$, and combines each with signals which originated from other input ports to form the sum $e_l$ at its lth output. Mathematically, the output voltage $e_l$ is given by:

$$e_l = \frac{E_l}{N} \cos(\bar{\omega}_{IF} t)$$

where:

$$E_l = \frac{\sin(\frac{1}{2}NX)}{\sin(\frac{1}{2}X)} * \frac{\sin(\frac{1}{2}NY_l)}{\sin(\frac{1}{2}Y_l)},$$

$$X = (\phi_S - \omega_1 t)$$

$$Y_l = \left(\frac{2\pi}{N}\right) - \frac{\omega_{IF}}{\omega_1} - (l - \bar{n})$$

Figure 6:
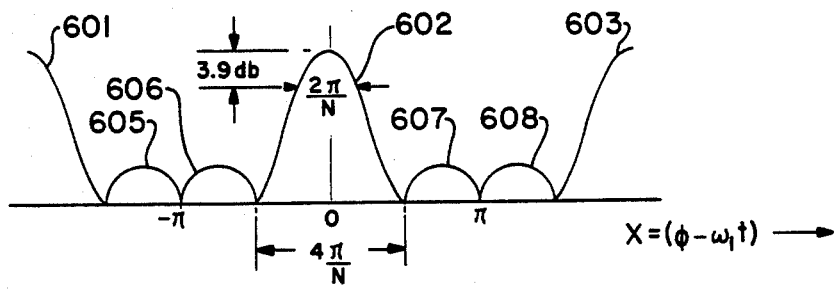
FIG. 6 is a graph of the time and incidence-angle-dependent factor of the envelope magnitude $|E_l|$, of an output voltage of the second Butler matrix in the present invention plotted against the composite variable X for $N=4$.

The function $e_l$ is the product of a carrier term and a doubly-modulated envelope term $E_l$. The first factor in the envelope term is similar to the one which modulates $e_m$ and was the subject of discussion in connection with FIG. 3. The magnitude of this first (time/angle-of-arrival) envelope is plotted for the case of N=4 in FIG. 6 against the composite variable X which is linearly dependent on both $\omega_1 t$ and $\phi_S$, and is independent of the Butler matrix output port designator, l. The graph shows that the beam-scanning action manifest in the outputs of the first Butler matrix 215 is also manifest in the outputs of the second Butler matrix 211. Also shown is the periodic compressed pulse nature of the output signal, the time domain response being a replica of the dynamic antenna pattern. Indeed, the major pulses shown within the range of abscissa plotted in FIG. 6 are a mainlobe 602 and two grating lobes 601, 603 of the antenna pattern. Also shown are four minor lobes 605, 606, 607 and 608 which constitute sidelobes of the antenna pattern. The width of a major pulse measured between points 3.9 dB down from peak response is $2\pi/N$ in terms of X which translates to a period of $2\pi/N\omega_1$ in terms of time.

Figure 7:
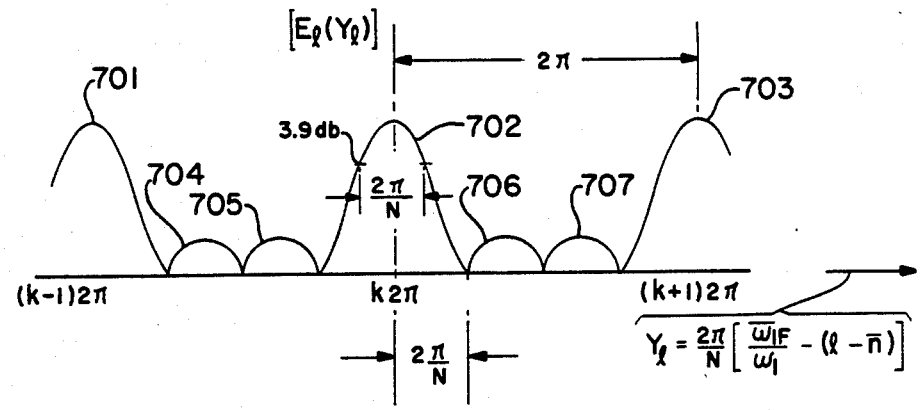
FIG. 7 is a graph of the intermediate-frequency dependent factor of the envelope magnitude $|E_l|$, for an output voltage of the second Butler matrix in the present invention plotted against the composite variable $Y_l$ for $N=4$.

The second envelope has the same form, but is a function of frequency rather than time or incidence angle. The magnitude of this second (frequency) envelope is plotted for the case of N=4 in FIG. 7 against the composite variable $Y_l$ which is linearly dependent on $\omega_{IF}$. The frequency envelope is plotted for a $4\pi$ range of $Y_l$ centered about $Y_l = 2\pi k$ when k is an arbitrarily chosen integer. The graph expresses the multiple bandpass filter action of the delay-and-add operations performed by the delay lines and the second Butler matrix. Shown within the range of abscissa plotted in FIG. 7 are three mainlobes 701, 702 and 703 of the frequency envelope function which constitute passbands and four sidelobes 704, 705, 706 and 707 of the envelope function which fill two reject bands. In a practical system where rejection band responses must be strongly suppressed; these sidelobes can be suppressed by amplitude tapering of the signals emerging from the first Butler matrix (the tapering operation to control frequency sidelobes is decoupled from the tapering operation to control time or angle-of-arrival sidelobes). The filtering is a result of phase cancellations rather than the frequency responses of the components (which are wideband). The width of each passband measured between nulls is $4\pi/N$ in terms of $Y_l$ which translates to $2\omega_1$ in terms of $\bar{\omega}_{IF}$. The width measured between points that are 3.9 dB down on the frequency envelope is $2\pi/N$ in terms of $Y_l$ which translates to $\omega_1$ in terms of $\bar{\omega}_{IF}$. This bandwidth expresses the range that the average frequency of the IF signal might have if it is to be passed to a particular port of second Butler matrix 211 and, as such, specifies the range over which the incident RF signal frequency might vary for reception at that port. It should be distinguished from the instantaneous bandwidth of the IF signal at that port which is $N\omega_1$ (in the case of an incident signal that is CW or of bandwidth small compared to $N\omega_1$). The separation of the passbands is $2\pi$ in terms of $Y_l$ which translates to $N\omega_1$ in terms of $\bar{\omega}_{IF}$.

Figure 8:
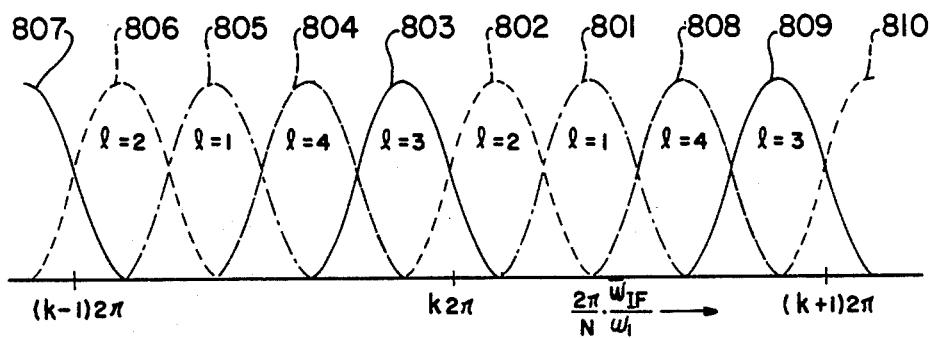
FIG. 8 is a graph of the intermediate-frequency dependent factor of the envelope magnitude $|E_l|$ for each of the output voltages of the second Butler matrix in the present invention plotted against the composite variable $Y_l$ for $N=4$.

An incident signal whose frequency is such that the signal does not cause peak response at a particular port of second Butler matrix 211 will also be received at one or more additional ports. Indeed, the N outputs of this second Butler network have the staggered frequency responses represented by the frequency envelope magnitudes plotted in FIG. 8 for the case where N=4. Four curves are plotted using different line codes, one for each of the four outputs. Only the mainlobes 801, 802, 3, 804 and grating lobes 805, 806, 807, 808, 809 and 810 are shown; the sidelobes have been suppressed for purposes of clarity. Adjacent mainlobes are spaced apart by $\omega_1$ in terms of $\bar{\omega}_{IF}$, and so crossover at points that are 3.9 dB down from the mainlobe peaks (for the case shown, i.e., a case in which there is no amplitude tapering). Taken together, the four curves form a continuum of responses in frequency so that all signals will be received; yet signals at closely spaced frequencies will be separated and will appear at different outputs.

Figure 9:
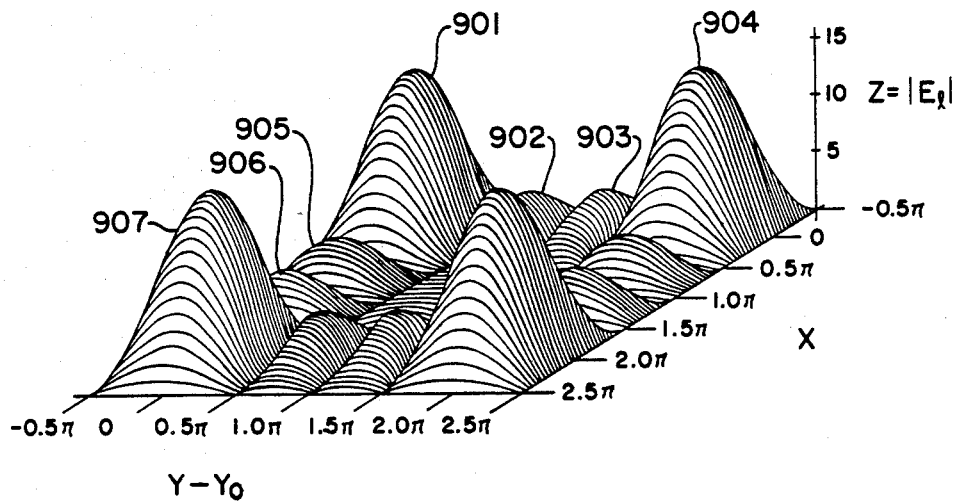
FIG. 9 is a three dimensional graph of the double modulation envelope factor magnitude $|E_l|$, of an output voltage of the second Butler matrix in the present invention plotted against both normalized frequency (Y-Axis) and time-encoded direction-of-arrival (X-Axis) for the case where $N=4$.

The magnitude, $|E_I|$ of the double modulated envelope of $e_I$ is plotted in a three dimensional graph in FIG. 9 for the case where N=4. In this figure $|E_I|$ (normalized signal response) is plotted against the Z axis versus both normalized intermediate frequency (Y-axis) and time-encoded direction-of-arrival (X-axis). The range of the Y-axis has been translated by $Y_o$ so that $Y-Y_o=0$ corresponds to the midband value of $\bar{\omega}_{IF}$, and this midband value has been chosen so that it is an integer multiple of $N\omega_1$. Four major lobes are shown within the range of the plot. The lobe 901 at (0,0) depicts the change in response as signal frequency (Y variable) is shifted from its midband value, or as time passes (X variable) from its starting value. Since this lobe represents a nominal benchmark in frequency and time it will be designated the mainlobe. The plot shows that as signal frequency is shifted from its midband value, the response will follow the mainlobe pattern, eventually dropping to zero. Further shift in frequency will cause minor response (sidelobes 902, 903). Still further shifts in frequency will cause another major response in accordance with the pattern of a grating lobe 904. Similarly as time is shifted from its initial value (with frequency fixed at the midband value) the response will follow the mainlobe pattern eventually dropping to zero. Further shift in time will cause minor responses (sidelobes 905,906). Still further shift in time will cause another major response in accordance with the pattern of a grating lobe 907. The reduced response all around each major response illustrates graphically how a signal response is simultaneously isolated in two dimensions. Such isolation is the first step in the process of obtaining joint resolution of signals in both the frequency and the spatial domains. The second and final step is the removal of ambiguities resulting from the grating lobe responses. The grating lobes in the time dimension (X axis) correspond to subsequent scan cycles rather than ambiguities if the antenna element spacing is made sufficiently close. The grating lobes in the frequency dimension (Y axis) can be eliminated by coarse frequency filtering. Precisely this function is provided by the coarse channelization filters 217 in FIG. 2. These filters divide the frequency coverage band into contiguous passbands, each of which is $N\omega_1$ wide and centered about a single major frequency response lobe of $E_I$. Thus if two signals were incident simultaneously from nearly the same direction but were separated by more than $\omega_1$ in frequency they would be unambiguously resolved, peaking at different output ports 214. Similarly, if two signals having nearly the same frequency were incident simultaneously from directions separated by more than $(2/N)$ in sin $\theta$ space (half-wave antenna element spacing) they would be unambiguously resolved, peaking at different times at a single output port 214. Also, by using pulse compression to accomplish this time multiplexing, the present invention preserves the inherent separation of two signals incident at two different times. Thus, multiple signals which arrive at the output ports 214 of the coarse channelizers are unambiguously resolved in frequency, direction and time.

The number of individual filters required at each coarse channelizer is equal to $\omega_T/(N\omega_1)$ where $\omega_T$ is the total frequency coverage bandwidth. Since there are N coarse channelizers, the total number of filters is $\omega_T/\omega_1$ which is the same number that are required in a single conventional channelized receiver providing simultaneous coverage of $\omega_T$ and a channel bandwidth of $\omega_1$. However, the channelization filters in the present invention have N times the bandwidth and so may be implemented at an IF frequency which is N times as high as that used in the conventional channelized receiver. This would permit the receiver of the present invention to have as much as N times the simultaneous frequency coverage as is possible with the conventional channelized receiver.

It is next of interest to compare the signal-to-noise ratio at the outputs 214 of the present invention to that available from a reference system, a single antenna element and mixer subject to the same incident wavefront. It will be assumed that dissipation losses occurring after front-end noise is introduced are zero since these losses have the same effect on both noise and signal and thus do not affect the signal-to-noise ratio. The peak value of signal power at an output 214 (effectively, the peak value of $e_I^2$) is $N^2$ times the signal power output by a single mixer (effectively $e_{IF}^2$). The noise power output can be derived by consideration of how noise power is distributed through the system of FIG. 2. The mixers 205 act independently to generate the primary sources of noise. Their noise is applied to the first Butler matrix 215 which both divides the noise input into N equal parts distributing each part to N outputs, and also sums the divided noise from each of its N inputs at every one of its outputs. Since the noise power is additive (the noise components at any one output being uncorrelated) the noise power at any output of the first Butler matrix is equal in value to that applied to any of its inputs by a single mixer. The delay lines 219 destroy any correlation between the N noise outputs of the first Butler matrix so that the action of the second Butler matrix 211 on the noise is a repeat of the process performed by the first matrix. Therefore, the noise power at any output of the second Butler matrix 211 is also equal in value to that output by a single mixer. As a result, the signal-to-noise ratio at any output of the second Butler matrix is $N^2$ better than that of the reference system. Further improvement in signal-to-noise ratio is obtained at the outputs of the coarse channelizers since the noise power is further divided by the number of channels, $\omega_T/(N\omega_1)$, while the signal remains essentially undivided. Thus, the signal-to-noise ratio at an output of the channelizer 214 is approximately a factor of $N\omega_T/\omega_1$ better than that of the reference system. At this point, it should be noted that in some applications, receivers are not required to be wide-open in frequency. For these applications, the output of the reference system could be augmented by a narrow-band filter to reduce noise. The bandwidth of this filter cannot be narrower than the spectrum of the signal to be received. Since $\omega_1$ in the system of the invention must also be at least as wide as that spectrum, the value of $\omega_1$ might be considered for the bandwidth of the output filter in this augmented reference system. That would improve the signal-to-noise ratio of the augmented reference system by the factor $\omega_T/\omega_1$. Therefore, for these narrow band applications, the signal-to-noise ratio at the output 214 of the current invention would be a factor of N better than that of the augmented reference system, which is, in effect, the directive gain of the array. It should be noted that this gain is achieved while providing simultaneous angle coverage over the whole field of view of a single antenna element.

In summary, the previous detailed description of the present invention has demonstrated the many advantages of the present invention compared to the prior art.

Alternative equivalent systems are considered within the scope of the invention. For example, alternative systems derived by the addition of a set of amplifiers prior to the mixing process or after the mixing process or the addition of preselector filters or attenuators or receive/transmit duplexers or any other set of devices normally found in the front end of a receiver are considered within the contemplations of the current invention because these devices do not alter the intent or the manner of operation of the invention, although to the extent that the transmission parameters of such devices fail to track each other, they can degrade performance.

All of the alternative equivalent forms of the invention have in common the following essence of the invention; the means to form multiple, time-sequenced outputs, each output corresponding to a different beam of sensitivity which scans the full coverage sector and together with the other outputs forms a contiguous set of such beams which both fill the coverage sector at any one time and scan the full coverage synchronously as a function of time; the means to differentially delay the time-sequenced outputs corresponding to an emitter at a fixed direction, so that the modulation envelopes of these outputs occur in unison; the means to coherently combine the time-aligned outputs selectively at different output ports for different emitter frequencies; and the means to separate multiple outputs at a single output port from emitters having frequencies corresponding to grating lobe responses. Although an azimuth plane is used for reference purposes, the present invention is capable of functioning in the same manner regardless of the plane in which the antenna elements lie.

While in accordance with the patent statutes, only the best mode and preferred embodiment of the present invention has been presented in detail, for the true scope and breadth of the invention, reference should be had to the appended claims.

What is claimed is:

1. Apparatus for adding the capability to separate multiple signals and for eliminating the sampling loss of signal energy in systems having a coverage sector through which the antenna system scans multiple beams at a rate that is faster than the information rate being received, comprising:
   (a) a linear phased array antenna comprising a row formed of a plurality of antenna elements, one of said antenna elements at one end of the row being designated the first element, while the remaining elements are designated by succeeding numbers in arithmetic progression across the row of antenna elements, and the antenna elements being considered as being positioned in the azimuth plane for reference purposes;
   (b) means for forming a plurality of beams of sensitivity coupled to said antenna elements, said plurality of beams of sensitivity being equal in number to the number of antenna elements in said row, the beams being contiguous and considered as lying in the azimuth plane for reference purposes, with each beam being generally evenly spaced from the adjacent beams in sin $\theta$ space, where $\theta$ is the angle away from broadside in the azimuthal plane, the spacing between beam center directions in sin $\theta$ space being generally proportional to the reciprocal of the number of antenna elements, and the beams, taken together to form a larger composite beam, span the entire azimuth coverage sector;
   (c) means coupled to said antenna elements for synchronously scanning each of the beams over the entire coverage sector, the beams maintaining their relative positions adjacent one another in sin $\theta$ space during scanning, the scanning being carried out periodically at a rate that is at least twice as fast as the highest information rate being received;
   (d) means coupled to said antenna elements for accepting signals received by each beam and differentially delaying said signals to cause their modulation envelopes to respond in unison to a single emitting source at a particular azimuth angle within the sector coverage of the antenna system;
   (e) means for coherently combining said signals after said signals have been differentially delayed, said means for combining being arranged to cause coherent addition selectively at different output ports of said combiner for different signal frequencies; and
   (f) means for separating multiple signals at a single output port of said combiner when said signals have frequencies corresponding to grating lobe responses.

2. An apparatus as in claim 1, further comprising:
   (a) a plurality of heterodyne mixers, equal in number to the number of antenna elements, each having an input port, an output port and a local oscillator port, each input port being coupled to a separate antenna element for frequency conversion of the signals received by said antenna elements, and each mixer being designated by the same number as the antenna element to which it is coupled;
   (b) means for generating a plurality of local oscillator signals equal in number to the number of mixers, each local oscillator signal being separately coupled to one of said plurality of mixers by way of its local oscillator port and each of said plurality of local oscillator signals assuming the same numerical designation as the mixer to which it is coupled, the frequency of each local oscillator signal being offset from that of the preceding one in the order of its arithmetic designation to order the frequencies of the local oscillators from the first to the last in a linear arithmetic progression with a common difference equal to the beam scanning rate, the means for generating the local oscillator signals producing coherently related local oscillator signals in that, at the same point in each cycle of the common difference frequency, the sinusoidal variations of the local oscillator signals simultaneously reach their
   (c) said means for forming a plurality of contiguous beams of sensitivity each designated by succeeding numbers in arithmetic progression in accordance with its position in the beam group, said means comprising an intermediate frequency beam-forming network having a plurality of input ports equal to the number of mixers, with each of said input ports being coupled to a separate output port of one of said mixers, and said intermediate frequency beam-forming network having a plurality of output ports equal to the number of beams, with each of said output ports being designated by the same number designation of the beam to which it couples, (d) said means for differentially delaying a plurality of signals comprising a plurality of delay lines equal in number to the number of beams, each having an input port and an output port, each input port being coupled to an output of the beam-forming network, each delay line being designated by the same number as the beam-forming network output port to which it is coupled, the delay of each delay line being offset from that of the preceding one in the order of its arithmetic designation to order the delays of the delaylines from the first to the last in a linear arithmetic progression with a common difference equal to the reciprocal of the product of the number of beams times the beam scanning rate;

(e) said means for coherently combining a plurality of signals comprising a second intermediate-frequency beam-forming network having a plurality of input ports equal to the number of delay lines, with each of said input ports being coupled to separate output port of one of said delay lines, and said second intermediate-frequency beam-forming network having a plurality of output ports equal to its number of input ports; and (f) said means for separating multiple signals comprising a plurality of frequency channelizers equal to the number of output ports of said second intermediate-frequency beam-forming network, each channelizer having an input port and a plurality of output ports equal in number to the integer value of the quotient of the quantities, overall frequency coverage bandwidth divided by the bandwidth of each channel, said channel bandwidth being generally equal to the product of the number of antenna elements times the beam scanning rate, with each said input port of each channelizer being coupled to an output port of said second intermediate-frequency beam-forming network.

3. A process for adding the capability to separate multiple signals and for eliminating the sampling loss of signal energy in antenna systems having a coverage sector through which the antenna system scans multiple beams at a rate that is faster than the information rate being received, comprising the steps of:

(a) providing a linear phased array antenna comprising a row formed of a plurality of antenna elements, one of said antenna elements at one end of the row being designated the first element, while the remaining elements are designated by succeeding numbers in arithmetic progression across the row of antenna elements, and the antenna elements being considered as being positioned in the azimuth plane for reference purposes;

(b) providing means for forming a plurality of beams of sensitivity coupled to said antenna elements, said plurality of beams of sensitivity being equal in number to the number of antenna elements in said row, the beams being contiguous and considered as lying in the azimuth plane for reference purposes, with each beam being generally evenly spaced from the adjacent beams in sin $\theta$ space, where $\theta$ is the angle away from broadside in the azimuthal plane, the spacing between beam center directions in sin $\theta$ space being generally proportional to the reciprocal of the number of antenna elements, and the beams, taken together to form a larger composite beam, span the entire azimuth coverage sector;

(c) providing means coupled to said antenna elements for synchronously scanning each of the beams over the entire coverage sector, the beams maintaining their relative positions adjacent one another in sin $\theta$ space during scanning, the scanning being carried out periodically at a rate that is at least twice as fast as the highest information rate being received;

(d) providing means coupled to said antenna elements for accepting signals received by each beam and differentially delaying said signals to cause their modulation envelopes to respond in unison to a single emitting source at a particular azimuth angle within the sector coverage of the antenna system;

(e) providing means for coherently combining said signals after said signals have been differentially delayed, said means for combining being arranged to cause coherent addition selectively at different output ports of said combiner for different signal frequencies; and (f) providing means for separating multiple signals at a single output port of said combiner when said signals have frequencies corresponding to grating lobe responses.

4. A process as claimed in claim 3, further comprising the steps of:

(a) providing a plurality of heterodyne mixers, equal in number to the number of antenna elements, each having an input port, an output port and a local oscillator port, each input port being coupled to a separate antenna element for frequency conversion of the signals received by said antenna elements, and each mixer being designated by the same number as the antenna element to which it is coupled;

(b) providing means for generating a plurality of local oscillator signals equal in number to the number of mixers, each local oscillator signal being separately coupled to one of said plurality of mixers by way of its local oscillator port and each of said plurality of local oscillator signals assuming the same numerical designation as the mixer to which it is coupled, the frequency of each local oscillator signal being offset from that of the preceding one in the order of its arithmetic designation to order the frequencies of the local oscillators from the first to the last in a linear arithmetic progression with a common difference equal to the beam-scanning rate, the means for generating the local oscillator signals producing coherently related local oscillator signals in that, at the same point in each cycle of the common difference frequency, the sinusoidal variations of the local oscillator signals simultaneously reach their peaks;

(c) providing said means for forming a plurality of contiguous beams of sensitivity each designated by succeeding numbers in arithmetic progression in accordance with its position in the beam group, said means comprising an intermediate frequency beam-forming network having a plurality of input ports equal to the number of mixers, with each of said input ports being coupled to a separate output port of one of said mixers, and said intermediate frequency beam-forming network having a plurality of output ports equal to the number of beams, with each of said output ports being designated by the same number designation of the beam to which it couples;

(d) providing said means for differentially delaying a plurality of signals comprising a plurality of delay lines equal in number to the number of beams, each having an input port and an output port, each input port being coupled to an output of the beam-forming network, each delay line being designated by the same number as the beam-forming network output port to which it is coupled, the delay of each delay line being offset from that of the preceding one in the order of its arithmetic designation to order the delays of the delay-lines from the first to the last in a linear arithmetic progression with a common difference equal to the reciprocal of the product of the number of beams times the beam scanning rate;

(e) providing said means for coherently combining a plurality of signals comprising a second intermediate-frequency beam-forming network having a plurality of input ports equal to the number of delay lines, with each of said input ports being coupled to a separate output port of one of said delay lines, and said second intermediate-frequency beam-forming network having a plurality of output ports equal to its number of input ports; and (f) providing said means for separating multiple signals comprising a plurality of frequency channelizers equal to the number of output ports of said second intermediate-frequency beam-forming network, each channelizer having an input port and a plurality of output ports equal in number to the integer value of the quotient of the quantities, overall frequency coverage bandwidth divided by the bandwidth of each channel, said channel bandwidth being generally equal to the product of the number of antenna elements times the beam scanning rate, with said input port of each channelizer being coupled to an output port of said second intermediate-frequency beam-forming network.

* * * * *